United States Patent [19]
Bedgedjian et al.

[11] Patent Number: 6,032,181
[45] Date of Patent: Feb. 29, 2000

[54] INTERACTIVE DISTRIBUTION SYSTEM FOR DIGITAL AUDIO-VIDEO SIGNALS

[75] Inventors: Jean C. Bedgedjian, Champs sur Marne; Guillene Teboul, Bry, both of France

[73] Assignee: U.S. Philips Corporation, New York, N.Y.

[21] Appl. No.: 09/248,534

[22] Filed: Feb. 11, 1999

[30] Foreign Application Priority Data

Feb. 25, 1998 [FR] France .................................. 98 02282

[51] Int. Cl.⁷ ..................................................... H04N 7/10
[52] U.S. Cl. .............................. 709/217; 348/12; 348/13; 370/394; 370/512
[58] Field of Search ..................... 348/12, 13; 709/217; 370/394, 503, 509, 511, 512, 513

[56] References Cited

U.S. PATENT DOCUMENTS

| | | | |
|---|---|---|---|
| 5,610,595 | 3/1997 | Garrabrant et al. | 370/394 |
| 5,778,000 | 7/1998 | Dosiere et al. | 370/512 |
| 5,864,682 | 1/1999 | Porter et al. | 348/12 |
| 5,878,041 | 3/1999 | Yamanaka et al. | 370/394 |
| 5,903,263 | 5/1999 | Emura | 348/12 |

OTHER PUBLICATIONS

ETS 300 800 (European Telecommunication Standard) Feb./1997.

*Primary Examiner*—Andrew I. Faile
*Assistant Examiner*—Hai Tran
*Attorney, Agent, or Firm*—Leroy Eason

[57] ABSTRACT

In an interactive audio-video digital distribution system a pointer is transmitted at least once every T milliseconds to indicate the position of a time marker. An interruption ($\bar{V}$) occurs every T milliseconds. A given number N of integer frames being transmitted in T milliseconds, there remains only space for transmitting a portion containing R symbols of the $N+^{th}$ frame before the next interruption. Following transmission of a signaling packet (x) with a pointer indicating a number (x) of symbol periods, during the next interruption N packets will have been completely transmitted since the last pointer, plus R symbols. The end of the transmission of this packet is waited for, that is, $U=C-R$ symbol periods before a new signaling packet (x-U) is transmitted. The value of the pointer contained in this packet will thus have to take this offset into account as it is decremented by U symbols, that is, x-U, and so on.

3 Claims, 2 Drawing Sheets

INTERACTIVE DISTRIBUTION SYSTEM FOR DIGITAL AUDIO-VIDEO SIGNALS

BACKGROUND OF THE INVENTION

The present invention relates to an interactive distribution system for audio-video signals, having a channel called downstream channel and a channel called upstream channel, the downstream channel transmitting signals in the form of digital packets from a server to users, a clock intended for multiplexing upstream messages from the users to the server being defined by markers whose position is periodically indicated by a number, called pointer, incorporated in one of the packets of the downstream channel, this pointer indicating the time that is left between the moment where the pointer appears and the moment where the marker is placed.

The invention also relates to an audio-video signal for a system having a channel called downstream channel and a channel called upstream channel, which signal is transmitted in the downstream channel in the form of packets and comprises, inter alia, a clock, used for the multiplexing of messages in the upstream channel, defined by markers whose position is periodically indicated by a pointer incorporated in one of the packets, the value of this pointer indicating the time that is left between the moment where the pointer appears and the moment where the marker is placed.

The invention also relates to a method of calculating in an interactive digital audio-video signal distribution system that transmits signals from a server to users in the form of packets, the value of a pointer indicating the position of a time marker incorporated in one of the packets, the value of this pointer indicating the time that is left between the moment where the packet containing the pointer appears and the moment where the marker is placed.

The invention is applied to interactive digital systems operating in networks such as cable and satellite networks.

An interactive distribution system for digital audio-video signals as defined in the opening paragraph is specified by the standards ETS 300 800 and DAVIC (ETS-European Telecommunication Standard). This standard provides a clock used for multiplexing upstream messages from the users to the server, which is defined by markers whose position is periodically indicated by a number, called pointer, incorporated in a packet.

SUMMARY OF THE INVENTION

It is an object of the invention to improve the definition of the clock for the synchronization of messages from the users to the server.

For this purpose, the system comprises means for generating a packet containing a pointer at an instant offset relative to that at which it should have been generated, and for diminishing the value of this pointer by a quantity equal to the time that has elapsed since the instant at which the packet containing the pointer would have had to be generated and the instant at which it is generated.

An audio-video signal is characterized in that a packet containing a pointer is generated at an instant offset relative to that at which it would have had to be generated, and the value of this pointer is diminished by a quantity equal to the time that has elapsed between the instant at which the packet containing the pointer would have had to be generated and the instant at which it is generated.

The method according to the invention comprises that a packet containing a pointer is generated at an instant offset relative to that at which it would have had to be generated, and that the value of this pointer is diminished by a quantity equal to the time that has elapsed between the instant at which the packet containing the pointer would have had to be generated and the instant at which it is generated.

These and other aspects of the invention are apparent from and will be elucidated with reference to the embodiments described hereinafter, which constitute a non-limitative example.

DETAILED DESCRIPTION OF THE PREFERRED EMBODIMENTS

Figure 1:
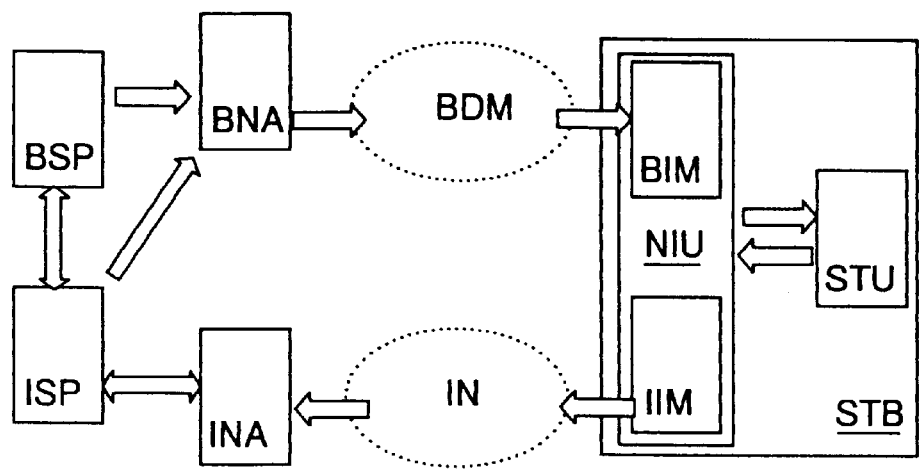
FIG. 1 diagrammatically shows the ensemble of a television distribution network, with interactivity.

The invention is illustrated, for example, by a television distribution network; it could also be applied to any other interactive digital signal distribution system. The television distribution network of FIG. 1 comprises in a downstream channel a server or broadcast service provider BSP which supplies the material to be transmitted to a broadcast network adapter BNA which adapts the broadcasts for transmitting them to a downstream link, or broadcasting delivery media symbolized by an oval dotted-line frame BDM. In practice, the BDM link is, for example, a digital terrestrial broadcast or a satellite broadcast, or also a cable distribution. On the receiving side, a user set top box STB comprises a network interface unit NIU formed by a broadcast interface module BIM and an interactive interface module IIM. The module BIM adapts the received signals so as to deliver them to a set top unit STU, capable of producing images and sounds.

As regards the upstream channel, the set top unit STU delivers messages to be sent to the server to the module IIM which adapts them so as to transmit them to an upstream link or interaction network, symbolized by a dotted-line oval frame IN. On the side of the server, an interactive network adapter INA adapts the received signals so as to deliver them to an interactive service provider ISP that transmits the messages to the broadcast service provider BSP.

In the In-Band mode, that is, with integrated signaling in the downstream video channel, the problem is to synchronize the user interface units with the system. A signaling relating to the upstream channel is received by the downstream channel. The downstream channel is formed by data that are broadcast in the direction from the network head-end to the users, which means that all the users receive all the data. The upstream channel is formed by data transmitted by the users to the network head-end which is the only one to receive the data. For this purpose, time markers are specified. They mark off the intervals of T milliseconds. Broadcast along the downstream channel, these markers are used by the user interface units to synchronize themselves. A marker is to be generated at least every T milliseconds, thus with at least one marker per marked-off interval.

Figure 2:
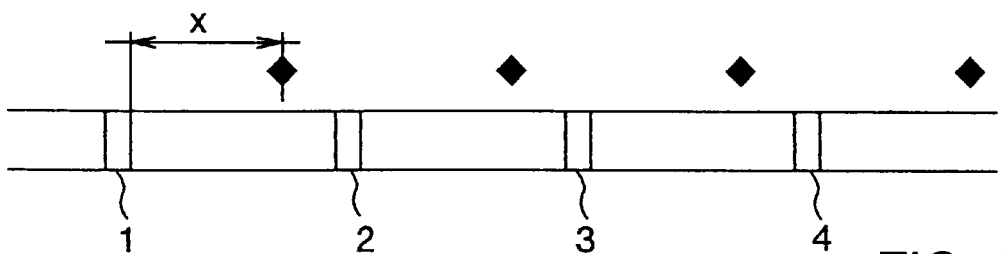
FIG. 2 is a timing diagram illustrating a downstream flow including the time markers and MAC-IB messages which enable the user interface units to reconstruct the messages.

FIG. 2 represents an example of a downstream In-Band flux with data frames whose sequence is periodically interrupted by signaling packets 1, 2, 3, 4 comprising a pointer. The pointer enables the user interface units to reconstitute the system clock represented by black diamonds.

The pointer contains, inter alia, a validity bit expressing the fact that the pointer is valid, and a field showing precisely the number "x" of symbol periods between the first symbol of the synchronization octet of the packet following the signaling packet and the next marker of the period of T milliseconds.

Figure 3:
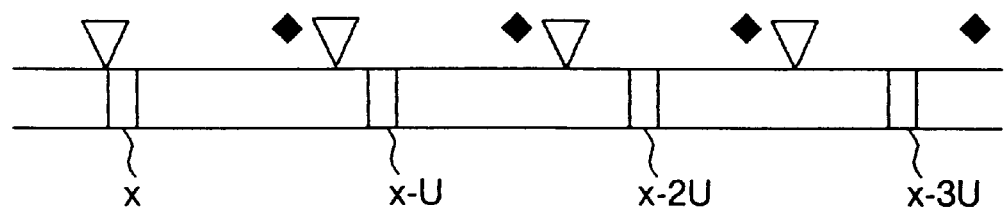
FIG. 3 is a timing diagram illustrating the connection between the time markers, the pointers and MAC-IB signaling packets.

In an ideal case, as this is described in FIG. 2, a signaling packet called MAC-IB (Media Access Control—In-Band) may periodically be inserted at the same position in the stream relative to the time markers in black. The problem setting in the concrete case of existing equipment comes from the fact that the signaling packet in question cannot always be inserted equally regularly relative to the packets. The signaling packets are inserted during interruptions that occur periodically. By calling the symbol frequency of the modulator used on the downstream path Fbaud, there are S=(T*Fbaud) downstream symbol periods in T milliseconds. If a frame represents C symbols in T milliseconds, N=INT(S/C) integer frames (INT is the "integer value" operator) are transmitted. Only place for transmitting R=S-(N*C) symbols of the N+$^{th}$ frame is left. If R is zero, there is an integer number of frames in a period of T milliseconds, thus the signaling packet containing the marker may be inserted precisely at each interruption, as in the ideal case of FIG. 2. If, on the other hand, R is not zero, the packet in question cannot be inserted precisely at each interruption, but with an offset. An illustration of this offset phenomenon is provided in FIG. 3. In real equipment, a packet containing at least the In-Band signaling data is inserted exactly every T milliseconds via an interruption, as is shown in FIG. 3, in which the interruptions are represented by triangles. It is supposed that the pointer must be transmitted at least once every T milliseconds, thus with each interruption. Let us suppose that at instant t, the first interruption has been generated and that the signaling packet MAC-IB generated in the adapter BNA has immediately been transmitted, as is represented in the first signaling packet of FIG. 3, thus with a number "x" of symbol periods. During the next interruption, in the case where R≠0, N packets have been transmitted completely since the last pointer, plus R symbols, on a total of C symbols of the running packet, which is the N+1$^{th}$ packet. Thus, the end of the transmission of this packet is to be waited for, that is, U=C-R symbol periods before the signaling packet MAC-IB is transmitted. The value of the pointer this packet contains will thus have to take this offset into account while being decremented by U symbols. This is illustrated in FIG. 3 in which the second transmitted signaling packet MAC-IB is offset relative to the interruption, and the value of the pointer it comprises is decremented by U symbols, that is, x-U. During the next interruption, that is, at t+T milliseconds, N packets will have been transmitted completely and C−(2*U) symbols of the N$^{th}$ packet. It will thus be necessary to wait for (2*U) symbols before the signaling packet MAC-IB can be transmitted, which will have a pointer value taking this (2*U)-symbol offset into account. This offset operation is repeated as described earlier.

Figure 4:
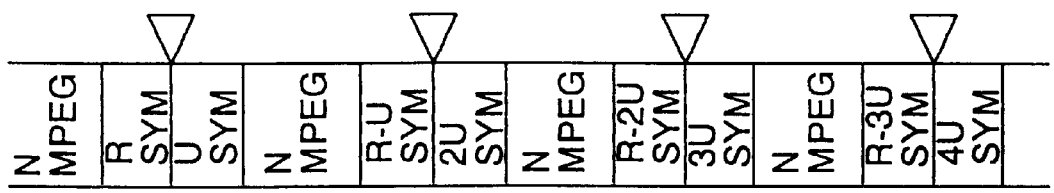
FIG. 4 illustrates an example of operation of the pointer.

FIG. 4 gives an example of operation of the pointer in the case of an MPEG standard. The indication N MPEG means N MPEG frames and SYM means symbol, thus R SYM or U SYM mean R or U symbol periods; it should be observed that the first N MPEG packet in this Figure is the MAC-IB packet containing the pointer. Other MAC-IB packets may be inserted at the end of the packet containing the pointer, these other packets have their zero validity bit and contain other types of signaling messages, but no pointer. The interruptions are represented by triangles. They are generated during the transmission of MPEG frames (R≠0). The symbols already transmitted at this instant are on the left of the interruption, whereas the symbols that are left to be transmitted are on the right.

However, when I*U, where I is the number of the current iteration counting from the start, exceeds C, that is, one MPEG frame, a modulo is effected introducing an MPEG offset packet.

A precise example will enable to clarify the view. Let us suppose that the chosen standard is ETS 300 800. The time markers mark off 3-millisecond intervals. A marker is to be generated at least every 3 milliseconds. A 64 QAM modulator symbol frequency is chosen, Fbaud=6.875 Mbaud. In this case, S=20 625 downstream symbol periods in 3 milliseconds. One MPEG frame represents C=272 symbols.

At least one MAC-IB packet is inserted exactly-every 3 milliseconds via an interruption, and the standard ETS 300 800 specifies that the pointer is to be transmitted at least once every 3 milliseconds, thus with each interruption. Let us suppose that at a first instant t, the first interruption has been generated and that the signaling packet MAC-IB has been transmitted immediately, as was represented in the first signaling packet of FIG. 3. During the next interruption N=75 MPEG packets have been transmitted completely since the last pointer plus R=225 symbols, on a total of C=272 for an MPEG packet, that is, R=(272−47) of the running MPEG packet. Thus the end of the transmission of this packet is to be waited for, that is, U=47 symbol periods for transmitting the signaling packet MAC-IB. The value of the pointer contained in this packet will thus have to take this offset into account while being decremented by U=47 symbols. During the next interruption, that is t+3 milliseconds, 75 MPEG packets will have been transmitted completely and (272−47−47) that is 178 symbols of the 76$^{th}$ packet. One will thus have to wait for 2U=94 symbols before being able to transmit the signaling packet MAC-IB which will comprise a pointer value that takes this offset by 2U=94 symbols into account, and so on and so forth.

In FIG. 4, this leads to the following values: each N MPEG has a value of 75 MPEG, R has the value: 225, U the value: 47. When n*47 exceeds 272, that is, one MPEG frame, a modulo is effected introducing an MPEG offset packet.

Figure 5:
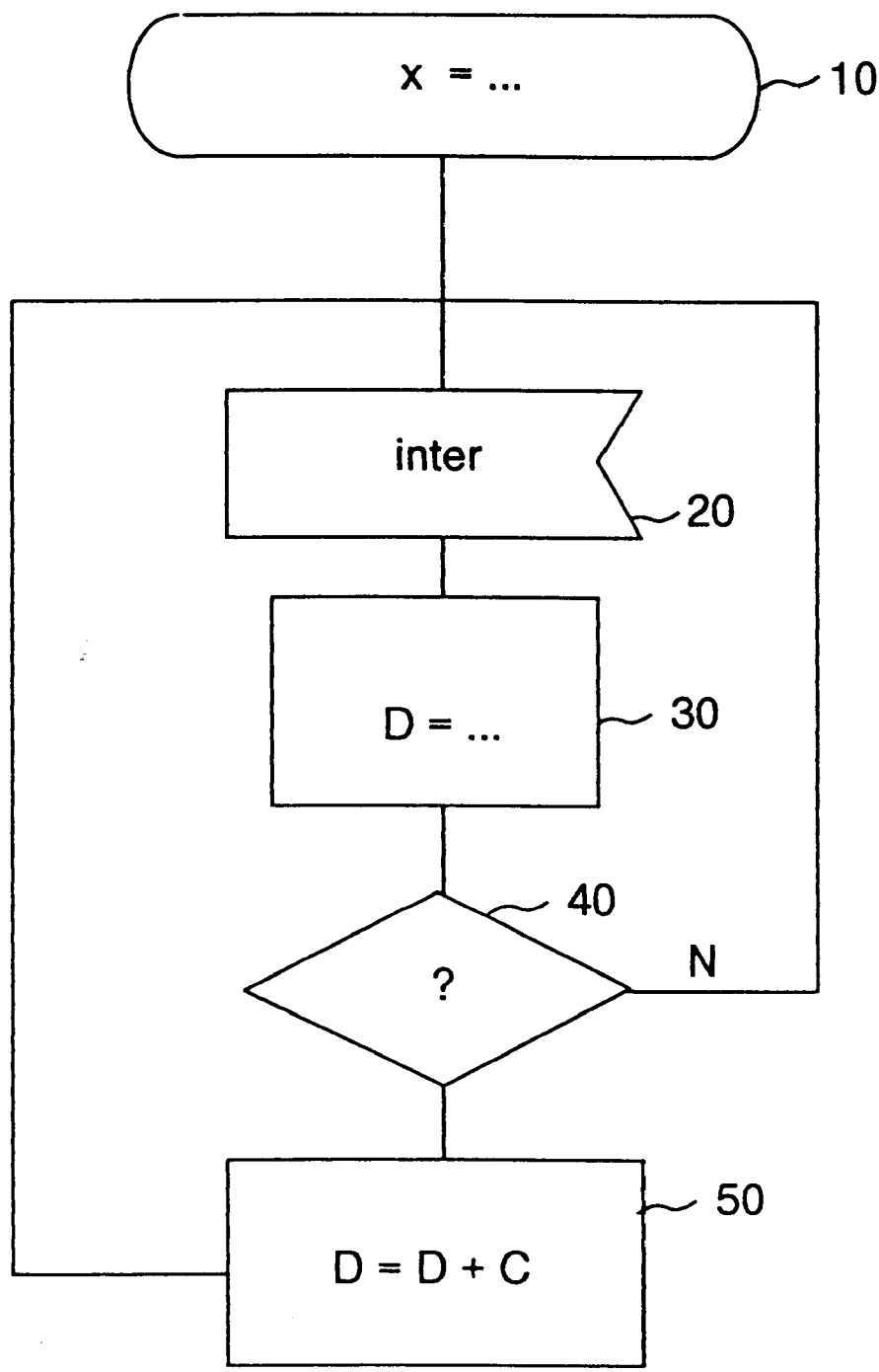
FIG. 5 is a flow chart illustrating a pointer generation algorithm.

In the flow chart of FIG. 5, the module 10 shows the initialization operation in which the start value of "x" is x=Offset+Decorrelation Factor "Offset" is a fixed value that may be comprised in the value "x", so that the pace of the system is synchronized with the network interface unit that is most remote from the network adapter, and that the pace is always controlled with positive values.

Decorrelation Factor is a multiple factor of C. It is used for freely positioning the reference of the time base of the user interface units in whatever interval of T milliseconds occurring after the interruption. Another method for realizing the same function would consist of offsetting the insertion of the MAC-IB packets containing a valid pointer.

The module 20 represents an interruption.
The rectangle 30 shows the operation:

Offset (I)=(Offset(I-1)-U) modulo-C+Decorrelation Factor.

The rectangle 40 shows the test:

Offset<=Decorrelation Factor+C.

Finally, rectangle 50 shows the operation:

Offset=Offset+C.

It should be noted that if R=0, then U=C and offset with each iteration.

We claim:

1. An interactive distribution system for audio-video signals, having a channel called downstream channel and a channel called upstream channel, the downstream channel transmitting signals in the form of digital packets from a server to users, a clock intended for multiplexing upstream messages from the users to the server being defined by markers whose position is periodically indicated by a number, called pointer, incorporated in one of the packets of the downstream channel, this pointer indicating the time that is left between the moment where the pointer appears and the moment where the marker is placed, characterized in that the system comprises means for generating a packet containing a pointer at an instant offset relative to that at which it should have been generated, and for diminishing the value of this pointer by a quantity equal to the time that has elapsed since the instant at which the packet containing the pointer would have had to be generated and the instant at which it is generated.

2. An audio-video signal for a system having a channel called downstream channel and a channel called upstream channel, which signal is transmitted in the downstream channel in the form of packets and comprises, inter alia, a clock, used for the multiplexing of messages in the upstream channel, defined by markers whose position is periodically indicated by a pointer incorporated in one of the packets, the value of this pointer indicating the time that is left between the moment where the pointer appears and the moment where the marker is placed, characterized in that a packet containing a pointer is generated at an instant offset relative to that at which it would have had to be generated, and the value of this pointer is dimished by a quantity equal to the time that has elapsed between the instant at which the packet containing the pointer would have had to be generated and the instant at which it is generated.

3. Method of calculating in an interactive digital audio-video signal distribution system that transmits signals from a server to users in the form of packets, the value of a pointer indicating the position of a time marker incorporated in one of the packets, the value of this pointer indicating the time that is left between the moment where the packet containing the pointer appears and the moment where the marker is placed, characterized in that the method comprises that a packet containing a pointer is generated at an instant offset relative to that at which it would have had to be generated, and that the value of this pointer is diminished by a quantity equal to the time that has elapsed between the instant at which the packet containing the pointer would have had to be generated and the instant at which it is generated.

* * * * *